(12) United States Patent
Douady et al.

(10) Patent No.: US 6,516,004 B1
(45) Date of Patent: Feb. 4, 2003

(54) HDLC DIGITAL DATA TRANSMISSION PROTOCOL CONTROLLER

(75) Inventors: César Douady, Paris (FR); Philippe Boucard, Le Chesnay (FR)

(73) Assignee: T. Sqware Inc., Santa Clara, CA (US)

( * ) Notice: Subject to any disclaimer, the term of this patent is extended or adjusted under 35 U.S.C. 154(b) by 0 days.

(21) Appl. No.: 09/209,801

(22) Filed: Dec. 11, 1998

(30) Foreign Application Priority Data

Jul. 31, 1997 (FR) .............................. 97 09803

(51) Int. Cl.[7] .............................. H04L 29/06; H04J 3/00
(52) U.S. Cl. ...................................... 370/498; 370/476
(58) Field of Search .............................. 370/321, 337, 370/347, 401, 442, 428, 280, 294, 345, 474, 476, 498, 536

(56) References Cited

U.S. PATENT DOCUMENTS 5,845,085 A * 12/1998 Gulick ..................... 709/236
5,878,279 A * 3/1999 Athenes ..................... 710/40
5,949,762 A * 9/1999 Green et al. ................. 370/259
6,188,699 B1 * 2/2001 Lang et al. ................. 370/400

FOREIGN PATENT DOCUMENTS

EP          323222 A2 *  7/1989  ........... H04B/7/185

* cited by examiner

*Primary Examiner*—Hassan Kizou
*Assistant Examiner*—Ahmed Elallam
(74) *Attorney, Agent, or Firm*—Piper Rudnick; Michael L. Kenaga

(57) ABSTRACT

An HDLC transmission protocol controller implemented as an integrated circuit that includes an input port receiving data transmitted by time-division multiplexing of basic HDLC messages, a universal synchronous-asynchronous receiver-transmitter USART module, enabling the parallel transmission of basic messages, a sequential storage module for the basic messages transmitted by the USART, and a reading and sequential processing module for the basic messages using serial processing, in accordance with HDLC protocol.

2 Claims, 3 Drawing Sheets

HDLC DIGITAL DATA TRANSMISSION PROTOCOL CONTROLLER

BACKGROUND OF THE INVENTION

1. Field of the Invention

Digital information or data is currently transmitted using a time-division multiplexing transmission (TDM) process.

In practical terms, such a process consists in time-multiplexing a specified number N of time routes or channels, the multiplexing taking place using a synchronisation pulse sent every 125 µs.

In Europe, the number of time channels is set at N=32, during each of which a basic message comprising n bits, for example a byte n=8, may be transmitted. Each successive byte defines a channel after each synchronisation pulse. Therefore, to transmit 32 channels, or a transmission frame, 256 clock cycles must be generated, one bit being transmitted on each clock cycle, equivalent to a frequency of 2.048 MHz.

In the United States, the number of routes or channels is limited to N=24, and to transmit a transmission frame, 192 clock cycles must be generated, equivalent to a frequency of 1.544 MHz, taking account of the addition of a transmission frame bit.

According to the applications proposed, each time channel is able to transport raw data, such as digitised audio-frequency data samples, or digitised data formatted in accordance with the HDLC protocol, High Data Link Control.

2. Brief Description of the Prior Art

As described in relation to FIG. 1a, this protocol consists in formatting this data in the form of HDLC messages, each basic message or transmission frame comprising an unspecified number of binary elements, which, in certain cases, may be a multiple of a character dimension, such as a byte. Each basic message comprises:

a flag marking the beginning and end of each basic message, constituting a transmission frame delimitation sequence;

an address field of the secondary station to which the basic message is to be sent, the address being encoded using 8 bits and enabling identification of the secondary station(s) involved in the information exchange considered;

a command field containing commands and responses, in addition to the sequence numbers encoded using 8 bits. This field is used by the primary station to indicate to the secondary station concerned which operation should be carried out by this secondary station to respond to the primary station;

a useful information or data field that may consist of any sequence of binary elements. The information may use a suitable character structure, such as bytes. In order to ensure transparency and coherence of transmission, strict encoding rules must be respected;

a control field, the error checking code, comprised either of a sequence of 16 binary elements obtained from a generating polynomial $x^{16}+x^{12}+x^5+1$, or by a sequence of 32 binary elements obtained from a generating polynomial $x^{32}+x^{26}+x^{23}+x^{22}+x^{16}+x^{12}+x^{11}+x^{10}+x^8+x^7+x^5+x^4+x^2+x+1$.

The transmitter should examine the content of each basic message between two flags, comprising all the aforementioned fields, and should insert a 0 element after any sequence of five consecutive 1s to ensure that a flag sequence is not reproduced. The receiver should examine the content of the message and should remove any binary 0 element that immediately follows five consecutive binary 1 elements.

The addresses, commands, responses and sequence numbers should be transmitted with the lowest weight element first. The order of elements transmitted in an information field is not fixed. The error checking code should be transmitted beginning with the highest term coefficient.

The time between basic messages is filled either by continuously transmitting flags, or by transmitting a minimum of seven binary 1 elements continuously, or by a combination of both. The use of flags and 1-sequences makes it possible to define the states of the transmission route.

A basic message is deemed incorrect when it is not correctly contained by two flag sequences, or when it is too short, for example when there are less than 32 binary elements between flags. The basic messages are ignored. Therefore, a basic message which ends in a number of consecutive 1s higher than 7 is ignored. For example, to invalidate a basic message, so that this is abandoned, 8 binary 1 elements should be transmitted consecutively.

Normally, the address field is encoded using a byte, 256 address combinations being possible. However, by agreement between the partners involved in the transaction, the address field may be extended by reserving the first binary element of each address byte, which is then set at zero, to indicate that the following byte is an extension of the basic address. The format of extended address bytes is identical to that of the basic address byte, and the address field may subsequently be extended. When address extensions are used, the presence of a binary 1 element in the first binary element of the basic address byte indicates the use of a single address byte. Extended addressing may be between 1 and 128 bytes.

Each flag is constituted by a zero-value bit, six 1-value bits and one zero-value bit. On transmission, a data block constituting the useful data to be transmitted is selected, the CRC error checking code is calculated and the data block is then subjected to HDLC formatting, which consists in identifying any continuous 5-bit sequence of binary 1 elements in the data block, and adding a zero-value bit to this continuous sequence.

This transcoding operation makes it possible to "crack" any bit pattern contained in the data, formed by a sequence identical to that of a flag, and thus to avoid confusion between this pattern and a flag. The formatted useful data, CRC error checking code and flags are then concatenated to form the basic HDLC message.

On receipt, the operations are carried out in reverse. An error checking code is recalculated based on the useful data received, after suppression of the zero-value bits added on transmission. The error checking codes are compared for validation or otherwise of the basic HDLC message transmission.

The aforementioned operations are carried out, both on transmission and receipt, using HDLC controllers. On receipt therefore, this type of circuit enables the basic HDLC messages to be extracted from a TDM data stream, so that these can be validated according to the aforementioned protocol, and the informative data received sent to the user system. On transmission, it enables the basic HDLC messages to be created from stored or transmitted data and entered in the TDM stream.

Each time channel from 1 to 32, as shown in FIG. 1b, thus enables transmission of successive basic HDLC messages $m_{110}$ to $m_{140}$, $m_{210}$ to $m_{230}$ and $m_{211}$ to $m_{212}$, constituting complete messages, or transactions $M_{10}$, $M_{20}$ and $M_{21}$ respectively.

A major constraint to the implementation of the HDLC data transmission protocol consists in the fact that to decode the formatted useful data, the context of the previous basic HDLC messages must be saved. For example, in order to control the error checking code, this code must be calculated based on the useful data received with the arrival of subsequent basic messages $m_{110}$, $m_{220}$, etc., constituting each transmission frame, before the CRC code calculated can be compared with the CRC code received.

In case of an HDLC protocol implemented on a TDM data stream, it is therefore necessary to store the N contexts of the CRC code at all times, with one context for each time channel.

The HDLC controllers currently available on the market, such as HDLC controller reference 29c94, marketed by the company MATRA HARRIS SEMICONDUCTOR, Route de Gachet, La Chantrerie, 44300 NANTES, incorporated in France, are comprised of dedicated wired or microprogrammed state machines, which, in order to generate the aforementioned context data, should have sufficient memory size. Memory is integrated with the controller for reasons of speed of access to this data and to minimise calculation time.

To implement these controllers, for example for N=32, controllers such as those shown in FIG. 1c, including a universal synchronous-asynchronous receiver-transmitter (USART) module, state machine and context memories, in addition to a serial link receiving the TDM stream, the useful data being delivered to the user system by way of a BUS link, the complete processing of a transmission frame, or 32 time channels, requires a time equal to 3.9 µs for each time channel. The processing of 32 time channels is thus carried out in parallel, from a macroscopic point of view, by the state machine, using the context memory which stores the error checking codes received. During the aforementioned time of 3.9 µs it is necessary for a time channel to recover the context, to carry out the aforementioned calculations and to transmit the status and to save the context.

OBJECTS OF THE INVENTION

An object of the present invention is to ensure relative independence between the TDM data stream and the calculation made, in order to minimise system costs by using standard, dynamic memories.

Another object of the present invention is to use the aforementioned standard memory to serialise the processing of basic HDLC messages.

Finally, another object of the present invention is also to enable implementation of HDLC protocol processing using a classic microprocessor.

SUMMARY OF THE INVENTION

The HDLC digital data transmission protocol controller, the object of the present invention, includes an input port for data from the data stream, transmitted using time-division multiplexing (TDM). It is noteworthy since it includes a universal synchronous-asynchronous receiver-transmitter (USART) module interconnected to the input port, allowing parallel transmission of basic messages constituting the N global messages using the (TDM) data stream transmitted. A sequential storage unit of basic messages transmitted in parallel by the universal receiver-transmitter (USART) module is provided. A module for the reading and sequential processing of the basic messages stored sequentially is provided, each basic message forming part of a global message subjected to serial processing in accordance with HDLC processing.

The HDLC digital data transmission protocol controller, the object of the present invention, has applications in the integrated circuit industry, using dynamic memories and microprocessors in the form of classic integrated circuits.

BRIEF DESCRIPTION OF THE DRAWINGS

This will become clearer on reading the description and consulting the drawings hereinafter in which, in addition to FIGS. 1a to 1c relating to the prior art, FIG. 2a contains an illustrative diagram of the preferential version of the HDLC protocol controller, the object of the present invention.

DETAILED DESCRIPTION OF THE PREFERRED EMBODIMENTS

A more detailed description of the HDLC digital data transmission protocol, consistent with the object of the present invention, will now be given in relation to FIG. 2a.

As shown in the aforementioned figure, the HDLC protocol controller, the object of the present invention, includes an input port, labelled I, for the aforementioned digitised data from a data stream transmitted by TDM time-division multiplexing. This TDM data stream consists in a number of successive basic messages on N time channels in accordance with the HDLC protocol described above.

Figure 1A:
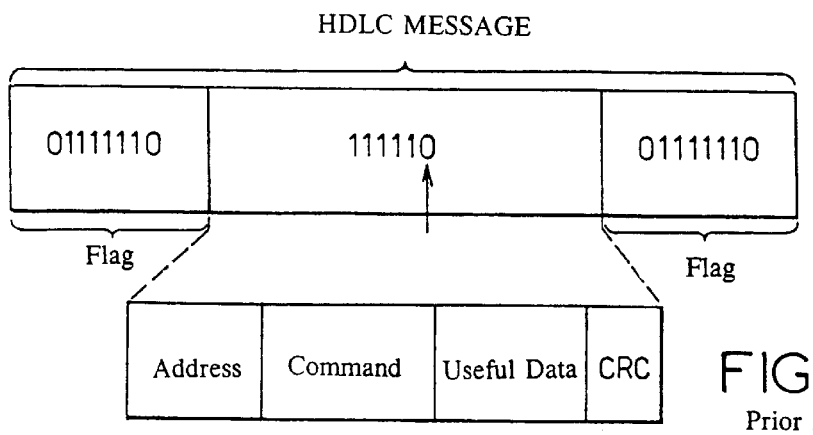
Figure 1B:
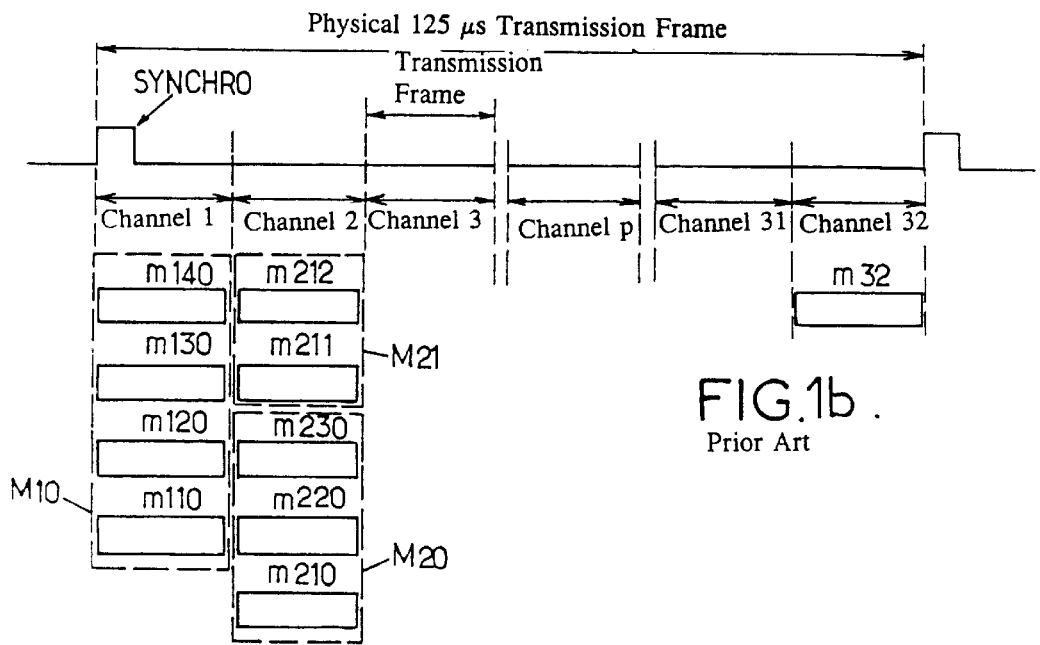
Figure 1C:
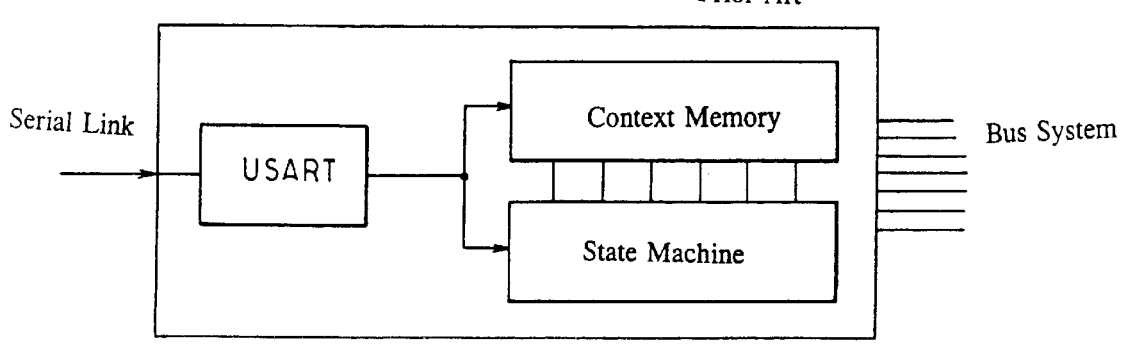

According to a particularly advantageous characteristic of the controller, the object of the present invention, it includes a universal synchronous-asynchronous receiver-transmitter, USART, module 1, this module being interconnected to the input port I and enabling, from the TDM data stream transmitted, parallel transmission of basic messages such as the messages $m_{110}$ and $m_{220}$ shown in FIG. 1b, these basic messages clearly constituting the N global messages.

The HDLC digital data transmission protocol controller, the object of the present invention, also comprises a sequential storage module 2 for the aforementioned basic messages, these basic messages, for a HDLC transmission frame, being transmitted in parallel by the universal receiver-transmitter, USART, module 1. It is indicated that module 1 is linked by a BUS connection to the storage module 2.

Furthermore, the HDLC protocol controller, the object of the present invention, includes a module 3 for the reading and sequential processing of the basic messages stored sequentially. The reading and sequential processing module 3 is interconnected by the aforementioned BUS link to the USART module 1 on the one hand and the sequential storage module 2 on the other.

More specifically, it is indicated that each basic message stored in the sequential storage module 2 is read by the reading and sequential processing module 3, each of these basic messages, which form part of a global message, then being processed successively, therefore in series, according to the HDLC protocol.

As a non-restrictive example, it is understood that on receipt for example, each basic message is opened for reading by the reading and sequential processing module 3, with the deformatting operations, that is, the suppression of the zero-value bits entered in the useful data on transmission, being carried out by this reading and sequential processing module 3, followed by calculation of the CRC error checking code based on the deformatted data, and comparison of the error checking code calculated with the corresponding error checking code received.

In particular, it is seen that this operation, carried out for a given basic message, is then executed for each of the subsequent messages stored in the storage unit 2.

In general, it is indicated that the reading and sequential processing module 3 may benefit from the addition of a calculation unit 31, which is interconnected to the storage module 2 by the aforementioned BUS link through a memory management circuit 30.

Figure 2A:
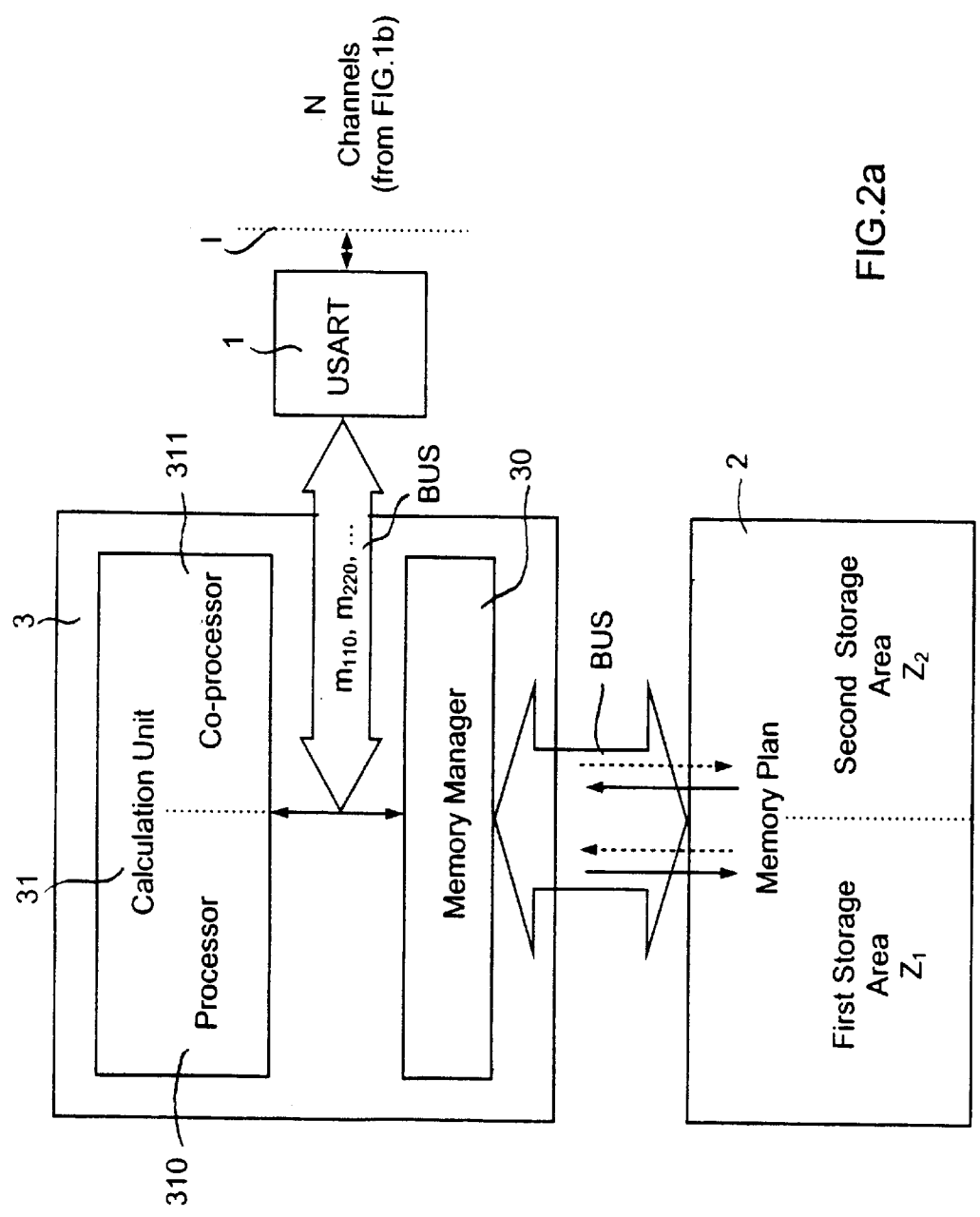
FIG. 2b contains a flowchart of a management program for a circular buffer-type memory.
Figure 2B:
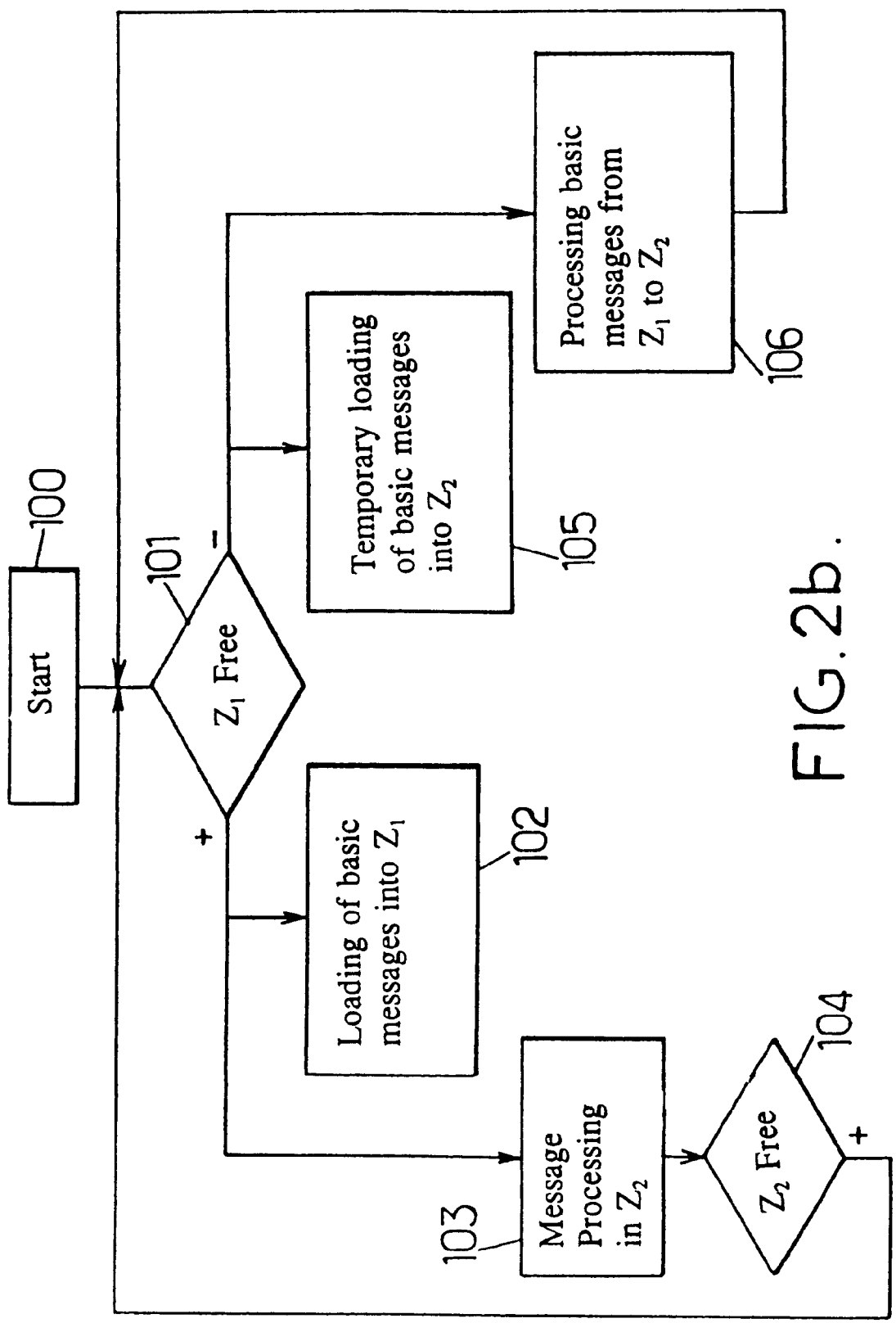

As also illustrated by FIG. 2a, the calculation unit 31 preferably comprises a standard processor, labelled 310, to which a co-processor 311, constituting a specialised processing unit, is added, intended for the execution of specific tasks concerning the processing of basic messages stored in the storage module 2. These specific tasks may be specific HDLC protocol tasks, such as the implementation of the transmission CRC error checking code and transcoding of the HDLC patterns to format the informative data and to deformat the informative data when the HDLC protocol controller, the object of the present invention, is used, whether this is on transmission or on receipt.

Whilst the processor 310 can be comprised of a standard processor, that is, eventually the user system microprocessor, the co-processor 311 may be constituted by a dedicated co-processor, that is, an arithmetical co-processor equipped with a read-only memory, enabling the carrying out of the classic operations described earlier within the context of the implementation of the HDLC protocol.

Similarly, it is indicated that the storage module 2 can be constituted by a random access memory, that is, the dynamic memory of the user system.

As shown in FIG. 2a, it is indicated that the memory management circuit 30 makes it possible to optimise management of the storage module 2, consisting of a standard memory type.

The memory manager 30 may comprise a management programme for the memory 2, the memory being for example divided into a first storage area $Z_1$ and a second storage area $Z_2$. The memory manager 30 may then manage the memory 2 in the form of a circular buffer comprising the first storage area $Z_1$ and the second storage area $Z_2$.

The first storage area $Z_1$ is intended to receive the basic messages sent by the universal synchronous-asynchronous receiver-transmitter module 1, and the second storage area $Z_2$, constituting the working memory, enables the reading and sequential processing module 3 to carry out the serial processing of the aforementioned stored basic messages, this processing being in accordance with the HDLC protocol.

By way of a non-restrictive example, following an initialisation stage labelled as START 100, memory management by the memory manager 30 following a test 101 on the first storage area $Z_1$, declared free, consists in stage 102 of loading the basic messages into first storage area $Z_1$, since in stage 102 the basic messages are loaded into the first storage area $Z_1$, the messages stored in storage area $Z_1$ being processed into the second storage area $Z_2$ sequentially in stage 103. Test 104 allows to verify that the second storage area $Z_2$ is free and that the coming back to the aforementioned initial conditions can be performed. In the event that the aforementioned test 101 indicates that the initial storage area is not free, that is, that this has been totally filled by successive basic messages, test 104 being positive and the second storage area $Z_2$ being free, a switching takes place, with the basic messages being loaded temporarily into the second storage area $Z_2$ in stage 105. In parallel with the aforementioned stage 105, the basic messages in the first storage area $Z_1$ are processed in order to empty this, then the basic messages stored in the second storage area $Z_2$ are processed to free this area. Operations 105 and 106 enable a return to the initial condition. The switching of the loading of basic messages between the first and second storage areas $Z_1$ and $Z_2$ takes place when the first storage area $Z_1$ is not free and the second storage area $Z_2$ is completely free. With regard to the practical execution of the HDLC digital data transmission protocol controller, the object of the present invention, it is indicated that the processor 310 and the co-processor 311 can be constituted by processors and co-processors serving the SPARC workstations. Under these conditions, it is also indicated that the memory used, that is, the storage area of the random access memory used, is relatively small, this memory consisting in an addressable storage area of the workstation's random access memory. It is indicated by way of a non-restrictive example that the memory must be comprised of 10K bytes for each time channel of the HDLC protocol.

A highly effective HDLC digital data transmission protocol controller has thus been described, simplifying the controllers described in prior art implemented using a dedicated state machine, with the result that system costs are reduced. In fact, the suppression of the controller itself is replaced by a standard DRAM memory and by optimisation of the calculation resources available, using in particular the standard system processor, which, when not saturated by HDLC protocol processing, can of course perform other tasks.

Finally, in an optimum version, the addition of a co-processor dedicated to HDLC protocol management tasks enables making the system independent from the TDM data flow.

What is claimed is:

1. A HDLC digital data transmission protocol controller, the controller including:

a data input port from a data stream, said data stream being transmitted asynchronously using time-division multiplexing (TDM) of messages over a number N of channels, said messages constituting N message quantities distributed over said number N of channels, universal synchronous-asynchronous receiver-transmitter means (USART), linked to said input port and enabling, from said transmitted data stream, synchronous transmission of basic messages, each basic message belonging to a respective message quantity, sequential storage means, linked to said universal synchronous-asynchronous receiver-transmitter means, for receiving and sequentially storing said basic messages, means for reading and sequentially processing said sequentially stored basic messages, said sequential storage means being managed as a circular buffer memory comprising at least a first and a second storage area, alternatively and respectively intended to:
receive and store said basic messages supplied by said universal synchronous-asynchronous receiver-transmitter means (USART), and act as a working memory by allowing said means of reading and sequentially processing to carry out serial processing of the stored basic messages, according to the HDLC protocol.

2. The controller according to claim 1, wherein said means for reading and sequentially processing the basic messages are further arranged for carrying out specific tasks of stored basic messages processing, according to the HDLC protocol, said specific tasks comprising the implementation of a transmission code checking error and transcoding of HDLC patterns.

* * * * *